United States Patent [19]

Kutscher

[11] Patent Number: 5,820,091

[45] Date of Patent: Oct. 13, 1998

[54] FUNCTIONAL COMPONENT USABLE FOR DEMONSTRATION AND/OR TRAINING PURPOSES

[75] Inventor: Erwin Kutscher, Ebersbach, Germany

[73] Assignee: Festo KG, Esslingen, Germany

[21] Appl. No.: 500,936

[22] PCT Filed: Feb. 20, 1994

[86] PCT No.: PCT/EP94/00130

§ 371 Date: Jul. 26, 1995

§ 102(e) Date: Jul. 26, 1995

[87] PCT Pub. No.: WO94/19786

PCT Pub. Date: Sep. 1, 1994

[30] Foreign Application Priority Data

Feb. 18, 1993 [DE] Germany ............... G 93 02 386.3

[51] Int. Cl.⁶ .................................................. A47B 96/06
[52] U.S. Cl. .................. 248/220.21; 248/221.11; 248/222.11; 248/223.41; 411/508; 411/913
[58] Field of Search ................ 248/682, 220.31, 248/221.11, 222.11, 222.12, 223.41, 225.11, 220.21; 411/508, 509, 510, 913

[56] References Cited

U.S. PATENT DOCUMENTS

| 3,640,497 | 2/1972 | Waki | 248/222.12 X |
| 3,722,239 | 3/1973 | Mestre | 248/222.12 X |
| 4,826,438 | 5/1989 | Torres | 434/219 |
| 5,154,304 | 10/1992 | McAuley | 248/221.11 X |
| 5,332,183 | 7/1994 | Kagayama | 248/223.41 X |
| 5,348,268 | 9/1994 | Klein | 248/222.11 X |
| 5,497,965 | 3/1996 | Mathieu, Jr. | 411/913 X |

FOREIGN PATENT DOCUMENTS

| 522633 A3 | 1/1993 | European Pat. Off. . |
| 2151387 | 7/1985 | United Kingdom . |
| 2176661 | 12/1986 | United Kingdom . |

*Primary Examiner*—Ramon O. Ramirez
*Assistant Examiner*—Derek J. Berger
*Attorney, Agent, or Firm*—Hoffmann & Baron, LLP

[57] ABSTRACT

A functional component usable for demonstration and/or training purposes which is releasably secured to the mounting surface of a support base (1) and for this purpose it is provided with a securing device engageable with the support base (1). The securing device (8) is formed as a clamp (11) which is provided with a clamping component (15) projecting on the underside of the functional component (5) and which engages a mounting recess (93) in the support base (1). The clamp (11) includes an actuating element (22) that permits the clamping component (15) to be mounted manually and without any tool between a clamped position and a released position, whereby, in its clamped position, it is prestressed transversely (16) to the mounting recess (3) against the surface of the mounting recess (3) and, in its released position, operates with a lesser prestress against the recess surface or is removed therefrom.

19 Claims, 2 Drawing Sheets

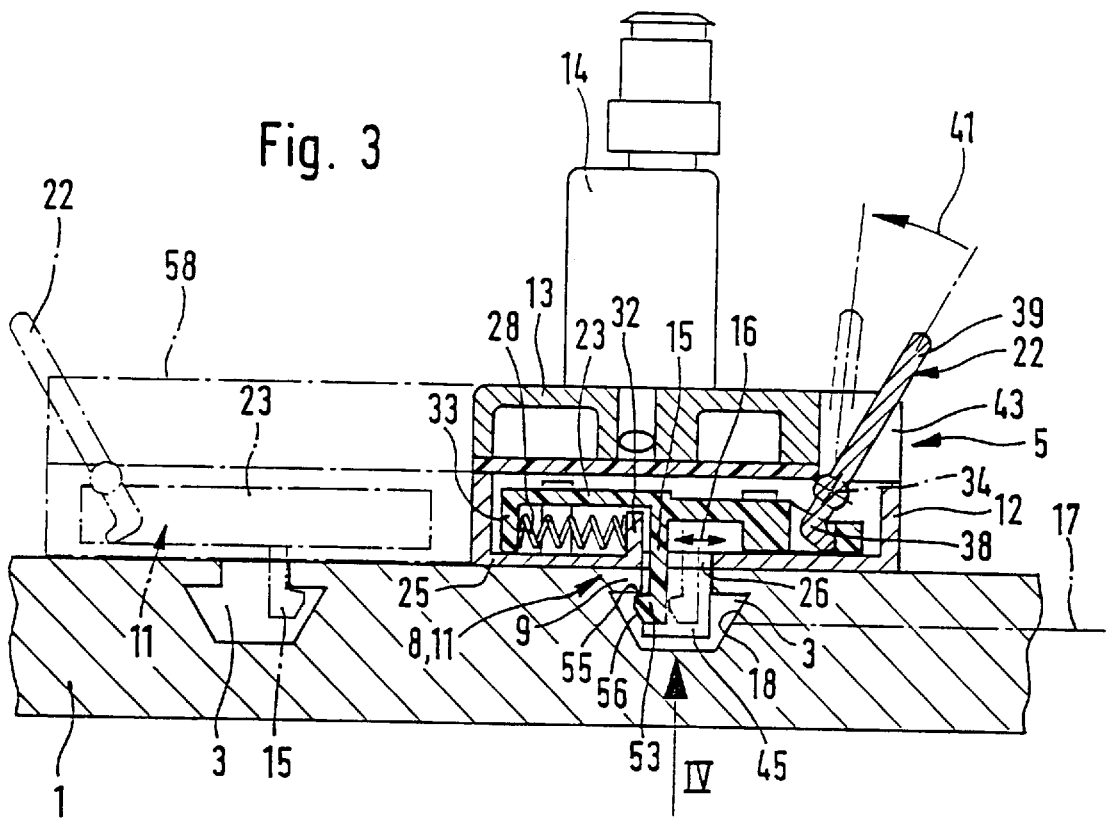
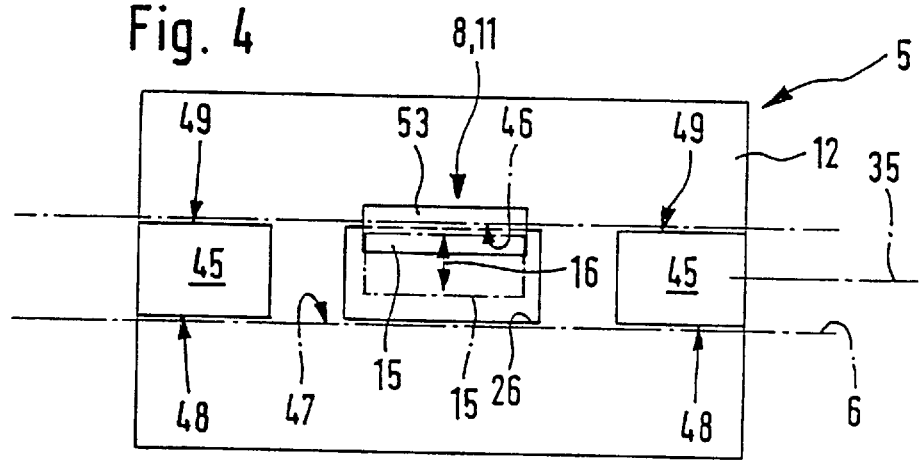

FUNCTIONAL COMPONENT USABLE FOR DEMONSTRATION AND/OR TRAINING PURPOSES

DESCRIPTION

The invention relates to a functional component usable for demonstration and/or training purposes in accordance with the preamble of claims 1 or 6.

In order to facilitate the understanding of individual structural elements or whole circuits, it is customary, in particular, in the fields of pneumatics, hydraulics and electronics to employ practical structures. In the case of the embodiment known from DE-GM 75 07 762, a plate-like mounting part is employed which is provided with a plurality of bores in a screen into which the individual functional component can be inserted. Each functional component contains a pneumatic, hydraulic, electric or electronic equipment, for example, valves operating cylinders, manometers, connection sleeves for electrical or pneumatic lines, electronic controls, etc.

The functional components may be mounted in accordance with a circuit diagram and subsequently may be connected with each other in the required manner fluidically and/or electrically.

A device of the aforementioned type is known from GB-A-2 151 387 The device consists of a plate-like support part with a plurality of mounting recesses wherein functional components equipped with functional units are anchorable therein. The functional components have a base body with two yielding shanks which are lockable in a clamped position into the mounting recesses. For removing from the support part, one of the shanks must be manually bent laterally.

The handling of the known functional component is problematic because compromises must be made during the mounting on the support part.

A high prestress which assures a good retaining force can hardly be realized because of the high bending forces required during assembly and disassembly. The stability may suffer with a reduced prestress.

It is an object of the invention to provide a functional component of the aforementioned type which permits a simple handling and a more flexible structure of embodiments will be demonstrated.

This object is solved by the characterizing features of claims 1 and/or 6.

The functional component is designed in such a manner that it is releasably secured on a support base which is provided with at least a groove-like mounting recess. Support bases of this type are known per se, for example, for DE-OS 40 10 840. It may be an injection molded plate-like structural element which is provided with a plurality of linear, parallel extending, adjacent mounting recesses, in particular, extending at the same distance with respect to each other, whereby the functional component can be releasably anchored in a given available mounting recess. A clamping device is provided as the securing device of the inventive functional component which has a clamping component extending downwardly, which, in the mounting position of the functional component, engages the selected mounting recess. In its clamped position, the clamping component is pushed against an upper surface of the mounting recess, so that the functional component is practically fixedly tensioned. For removing, one merely has to actuate the actuating element, so that the clamping component assumes the detachable position and the functional component can be removed from the support base without any problems. A tool is not required because the force of the human hand suffices for actuation. During the mounting on the support base, the clamping component is advantageously maintained in its detachable position by means of the actuation element. With a corresponding design, it may also be provided that the clamping component normally assumes its clamped position and, during insertion into the mounting recess, it automatically moves for a short time in the direction of the detached position, thus practically engaging itself.

The functional component can be arranged stepless at any given position along the given mounting recess and be clamped. One may arrange the device in such a manner that despite being in the clamped position, a certain longitudinal displacement in the mounting recess may be caused with a certain force effect, so as to perform fine adjustments. Even complex circuits may be installed compactly and with space saving on a support base with the functional components in accordance with the present invention.

If a lever transmission is provided, one may generate high clamping forces and, simultaneously, one may keep the adjustment forces low in favor of a simple handling.

A clamping component with a common support part which is inserted into a common mounting recess enables compact dimensions, whereby the base body which rests on the support plate enhances the stability.

Advantageous further embodiments of the invention are mentioned in the subclaims.

A particularly effective attachment is provided when the clamping component engages behind a holding extension of the mounting recess in the form of an anchoring extension in the clamped position. This is particularly advantageous when the mounting surface is directed in an inclined or even vertical direction.

Preferably the support base is fixedly mounted on the base body, whereby the clamping component is movable thereto. It may also be used for centering, in that it practically engages simultaneously on both recess flanks in the mounted position, thus stationarily locking the transverse position of the functional component with respect to the support part.

In the following, the invention will be explained in more detail in conjunction with the appended drawings. The drawings show in detail:

Figure 2:
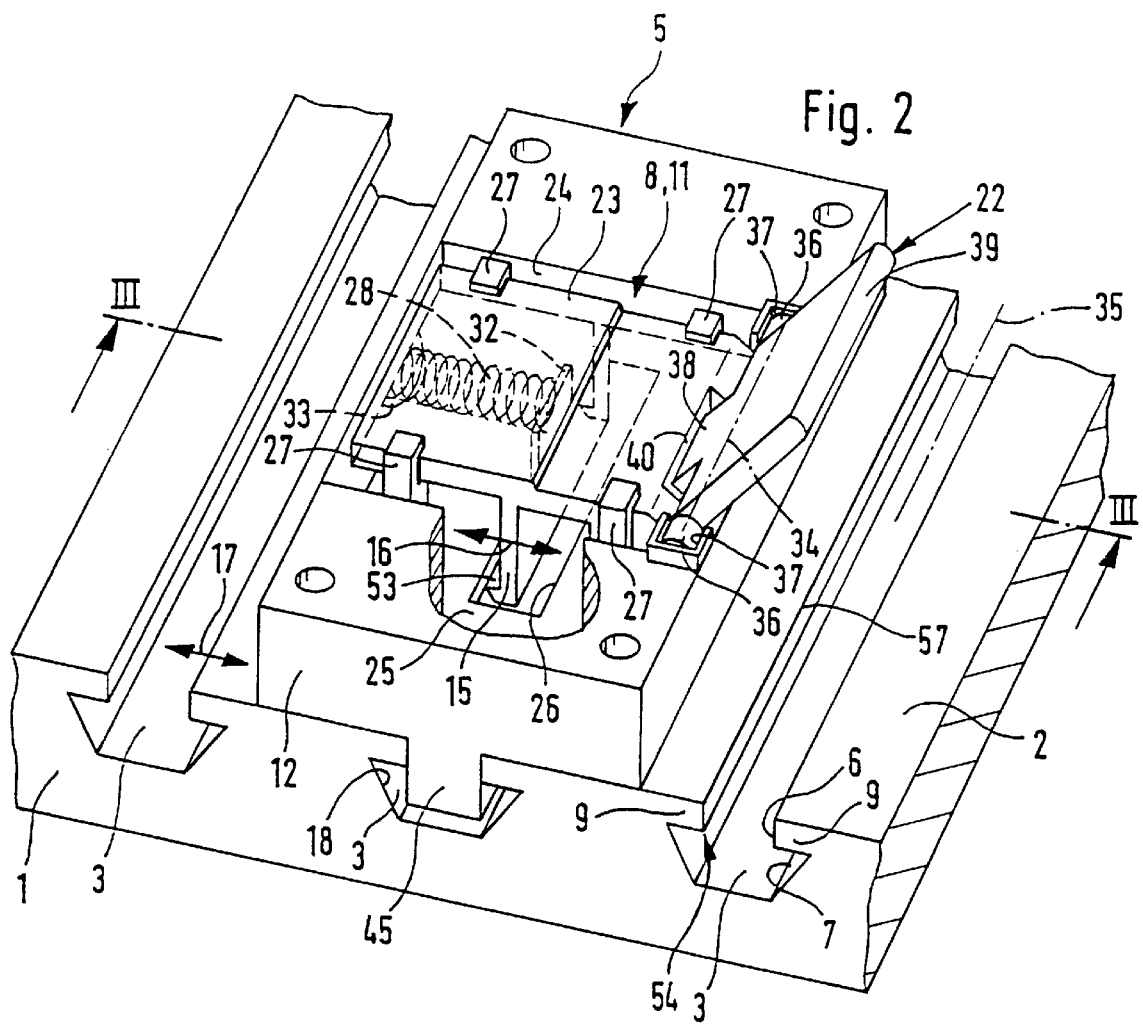
FIG. 2 is a functional component in a clamped position in a perspective view, whereby the commonly present functional unit of the functional component is removed, so as to improve the view of the clamping component and whereby the support base is only shown sectionally.

FIG. 3 is a cross-section through the device of FIG. 2 in accordance with cross-sectional line III—III, whereby the functional component is shown completely with a functional unit and whereby with the dash-dotted lines in the left side of the drawing illustrates the structure of a second functional component which is anchored simultaneously in two mounting recesses; and FIG. 4 is a view of the underside of the functional component of FIG. 3 seen in the direction of arrow IV, whereby with dash-dotted lines the contour of the neck portion of the clamping component of the support base (not shown) is indicated.

Figure 1:
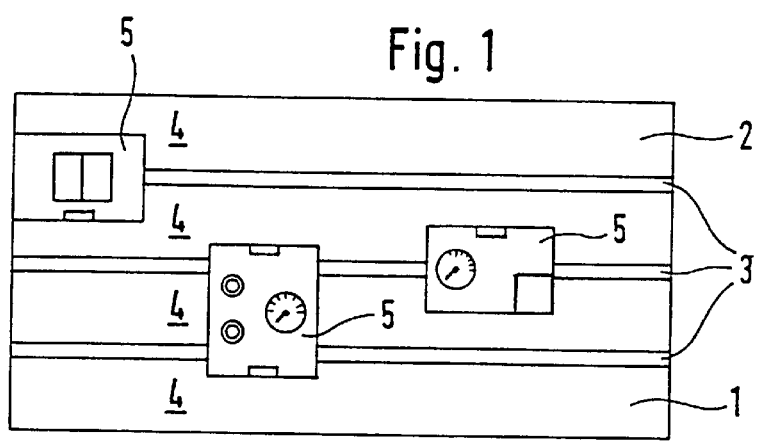
FIG. 1 is a plurality of functional components mounted in a clamped position on a support part in a schematic illustration with a plan view on the mounting surface of the support base.

A particular plate-like support base 1 can be seen in FIG. 1. Preferably, it has a rectangular outer shape. One of the two large plate faces forms a mounting surface 2, which is shown in a plan view. The support base is provided with a plurality of mounting recesses 3 extending in a linear direction, parallel with respect to each other, and at a uniform distance adjacent to each other. They are arranged from the mounting surface 2 into the support base 1 and therefore open longitudinally with respect to the mounting surface 2. The mounting recesses 3 discharge on the opposite front faces of the support base 1, which can be seen very well in the enlarged illustration of FIG. 2. The support base 1 may be an injection molded profile part. In view of the mounting recesses 3, the mounting surface 2 is separated into a plurality of adjacent surface segments 4.

In furtherance, FIG. 1 illustrates a plurality of functional components 5 which are mounted on mounting surface 2 and which are anchored in at least one mounting recess 3. The central functional component 5 is simultaneously anchored in two mounting recesses 3, while the remaining functional components 5 are anchored in only a single mounting recess 3.

The functional components 5 relate to components of a given structure to be built, in particular, of the pneumatic and/or hydraulic and/or electric and/or electronic and/or optical type. The individual functional components 5 may be connected with each other by means of suitable lines (not shown). The mounting location on the mounting surface 2 is randomly selectable, whereby the user selects the most favorable mounting location according to his requirements. The functional components 5, in particular, enable construction of a device to be installed for test purposes, so as to determine the most favorable line connection. Then, one practically has a model which demonstrates actual conditions. In addition, the device is also employable for training purposes in that it permits complicated relationships to be visually shown.

Corresponding to their function, the individual functional components 5 are equipped with suitable construction parts. These may be valves, operating cylinders, manometers, electronic controls, or connecting sleeves for pneumatic and/or hydraulic lines, for example, whereby this listing is not complete by any means.

As can be seen from FIG. 2, the mounting recesses 3 have the same configuration among each other. Starting from the mounting surface 2, a neck portion 6 is provided with a subsequent expanding mounting segment 7, in a depth direction. In this manner a holding extension 9 is formed at both sides of neck segment 6 extending from the transition area between the neck segment 6 and mounting segment 7. The mounting recesses 3 are in the form of T-grooves.

As can be seen in detail from FIGS. 3 and 4, the functional component 5 is provided with a securing device 8 which is used to retain the functional component 5 releasably on mounting surface 2 of support base 1. The securing device 8 is formed as a clamping device 11 permitting a quick mounting and disassembly without employing any additional tools, but only by using the human hand. Therefore, the functional component is very service oriented.

The exemplary functional component 5 has a modular structure. It has a plate-like base body 12 on which the clamping device 11 is provided. In the clamped position of the functional component 5 on the support base, the base body 12 is supported with its underside on mounting surface 2. A functional unit 13 is releasably mounted on the upper surface of base body 12. This contains one or a plurality of the already mentioned structural elements with which a certain circuit should be built or simulated. In the case of the exemplified embodiment, the functional unit 13 is equipped with two connecting sleeves 14 for pneumatic lines and a manometer, whereby only one of the connection sleeves 14 is visible, while the other parts are above the sectional line. Other functional components 5 are also equipped with a base body 12 of the shown type, but naturally have a structure of different functional units 13. By having a suitable selection of functional components 5, one can provide an assembly of unit parts with which a demonstrable instruction can be performed for teaching purposes.

The clamping device 11 will be considered in detail in the following. The same is equipped with a clamping component 15 which extends on the underside of functional component 5, thus protruding downwardly beyond the base surface of base body 12 in the exemplified embodiment. Its length is so selected that it immerses into the associated mounting recess 3 from the mounting surface 2 in the mounting position of functional component 3, without being supporting on the bottom of the mounting recess 3. The clamping component 15 is reciprocatedly mountable in a transverse direction with base body 12 in accordance with the double arrow, whereby this transverse direction of the mounting recess 3 which extends parallel to the mounting surface 2. in this manner, the clamping component 15 may be displaced into a clamped position shown in full lines in FIGS. 2 through 4, and a detached position as shown in a dash-dotted line in FIGS. 3 and 4. In the clamped position, the clamping component 15 is prestressed against the recess surface 18 of mounting recess 3. Subsequently, one obtains a frictional connection which assures that the functional component 5 is retained on support base 1, and that it cannot be removed from the mounting surface 2 of support base 1. On the other hand, in the detached position, such a removal is possible, in particular, in a direction of a right angle with respect to the mounting surface 2, since here the prestress between the clamping component 15 and the recess surface 18 is considerably lessened and preferably neutralized, in that the clamping component 15 is mounted at a distance from the recess surface 18.

The displacement of the clamping component 15 from the clamped position into the released position is caused by a manual and toolless influencing of an actuating element 22 of clamping device 11. The same is very well reachable since it extends over the outer contour of the functional component 5 in the exemplified embodiment.

In the illustrated preferred embodiment, the clamping component 15 is a part of a slide 23 with which it is formed as a unitary element. Advantageously, the slide 23 consists of a plastic material. It is moved in a transverse direction 16 displaceably on base body 12. When the slide is moved, the clamping component 15 is also moved. The slide can be displaced such that the clamping component 15 can assume the clamped position as well as the released position. Advantageously, both of these positions will be defined by the two end positions of the slide.

Advantageously, slide 23 engages a recess 24 of base body 12 which is open with respect to the above located functional unit 13, by way of example, and is covered by the same. The recess 24 is limited by a bottom 25 of base body 12 which includes an aperture 26 through which the clamping component 15 extends. The aperture 26 is at last as wide as the clamping component 15 and has the required free space for the transverse movement 16 thereof.

The slide 23 is displaceably supported on the bottom 25 of base body in the exemplified embodiment. On top, it is gripped by one or a plurality of, in particular, gripper-like guide elements 27 which are mounted on base body 12 and are attached thereto forming one element. In this manner the height position of slide 23 is fixed. The sidewise support for the slide 23 is provided by parts of the base body 23, which are also provided on guide elements 27, by way of example. These are advantageously elastically bendable engagement elements which can be bent temporarily outwardly for mounting and/or disassembly of the slide 23 transversely to its longitudinal direction.

Preferably, the clamping component 15 is yieldingly prestressed in the clamped position. For this purpose, a spring arrangement 28 operates between the slide 23 and base body 12, in the exemplified embodiment. It tensions the slide 23 into an initial position wherein the clamping component 15 assumes the clamped position. It is advantageous if the spring arrangement 28 is located in the recess 24 at the area below the slide 23 and above the base body bottom 25. Thus, the spring arrangement 28 is prevented from accidentally jumping out of position when exchanging the functional unit 13. On the one hand the spring arrangement 28 can be supported on a base body wall 32 extending upwardly from bottom 25 in close proximity of aperture 26. On the other hand, the spring arrangement 28 can operate against a downwardly extending slide wall 33 which is located at one of the end area of slide 23 on the side of the aperture 26 at which the base body wall 32 is located. In this manner the clamping component 15 is pulled in a direction along the longitudinal edge of the aperture 26 which is adjacent to the base body wall 32 in the clamped position. Hence, the spring arrangement 28 is positioned in a particularly compact manner, whereby it is a pressure spring arrangement consisting of a screw spring, for example.

The actuating element 22 could be an integral part of slide 23, whereby the slide 23 and the actuating element 22, during the displacement between the clamped position and the released position, perform an identical transverse movement 16. However, advantageously the selected structure is wherein a separate actuating element 22 is supported, on the one hand, on base body 12 and, on the other hand, is coupled with slide 23. This enables an embodiment wherein the actuating element 22 engages the slide 23 and thereby the clamping component 15 with lever transmission. By using a strong spring arrangement 28, large clamping forces can be realized with respect to clamping component 15 and simultaneously hold down the forces required when handling the actuating elements, so that no further adjustment means are required.

In the case of the exemplified embodiment, the actuating element 22 is formed as a pivot part which is pivotably mounted on base body 12. Preferably, the mounting location is in the area of the slide end positioned opposite the spring arrangement 28 and, in particular; above the same in the rim area of base body 12. The actuating element 22 is pivotably mounted on the base body 12 by means of a pivot axis 34 which, in the mounted position, is parallel to the longitudinal direction 35 of mounting recesses 3 and, thereby, at a right angle to the displacement direction 16 of slide 23. By way of example, the actuating element 22 is provided with a pair of support pins 36 on opposite sides which are mounted rotatably in a support pocket 37 of base body 12 and which are covered by the same during a mounted functional unit, thus being prevented from dropping out.

The actuation element 22 in the exemplified embodiment has a lever function. It has a first shorter level arm 38 which preferably extends obliquely downward in a direction toward slide 23 from pivot axis 34 and engages the slide. A second longer lever arm 39 extends from pivot axis 34 obliquely upwardly away from slide 23, advantageously in the opposite direction to the shorter lever arm 38. The engagement between actuating element 22 and slide 23 preferably is performed in that the shorter lever arm 38 engages with its free end into a recess 40 of slide 23.

In the clamped position, the actuation element 22 assumes the initial position shown in FIGS. 2 and 3. The accessible longer lever arm can now be actuated for a manual actuation in accordance with arrow 41 inwardly toward the slide, whereby this pivot movement causes the shorter lever arm 38 to act on slide 23 and release the slide into a released position. If one releases the longer lever arm 39, the clamping component 15 automatically returns into the clamped position in view of the applied spring force, whereby the actuating element 22 is also moved back into the initial position. With respect to the actuation, it has been shown to be advantageous if the longer lever arm 39, in the initial position of actuating element 22, is arranged in an inclined position with respect to the mounting surface 2 and extending obliquely upwardly so that its longitudinal axis encompasses an acute angle with the mounting surface 2 at the outer surface opposite the slide 23.

It is advantageous if the functional unit 13 is provided with a recess 43 in the area of actuating element 22 permitting its penetration and pivotal movement. In order to realize a small structure, the actuating element 22 preferably extends in the area of the upper surface beyond base body 12, so that the sidewalls may extend upwardly around the base body.

It would be feasible to provide at least two movable clamping components on functional component 5 between a clamped position and a released position which engage into the same actuating recess 3 in the mounted position. Considerably easier is the structure given in the example, which in addition, enables an accurate reproducible positioning of the functional component 5 during each assembly.

In addition to moving the clamping component 15 relative to base body 12, the clamping device 11 is provided with a downwardly extending support part 45 which protrudes beyond the bottom surface of the base body 12 and which is present, by way of example, in a number of pieces. The given support part 45 is stationary with respect to the base body 12, in particular rigid, whereby a unitary design is made possible. In the mounted position, the support parts 45 extend into the associated mounting recess 3 and, the clamping component 15 is prestressed in the clamped position in the direction of the one recess flank 46 so that the support parts 45 are pushed with a first support face 48 against the opposite recess flank 47, so that a support is provided.

Although the functional component 5 may be already secured in an accurate alignment in the mounting position, it is advantageous if the support parts 45 are provided with a second support face 49 facing away from the first support face 48, which, in the mounted position, also engages the recess 3 and are thereby facing the recess flank 46 against which the clamping component 15 also operates in the clamped position. Advantageously, the support parts 45 are formed by protrusions on base body 12, and the support faces 48, 49 are located at opposite outer faces of the given support part 45 as viewed in the transverse direction 16. The distance separating the two support faces 48, 49 measured along the transverse direction 16 is preferably selected in such a manner that the support parts 45 are received at least substantially free of play in the mounting recess 3, so that a transverse support of the functional component 5 occurs with respect to the support base 1 in both directions independent from the position of clamping component 15.

If need be, the first and second support faces 48, 49 may be provided on different support parts 45. It is a further advantage if the clamping component 15 is flanked on both longitudinal directions 35 by at lest one support part 45. The support parts 45 may form centering elements which enable an accurate centering of functional component 5 with respect to the associated mounting recess 3 in view of the provided support parts.

A particular secure anchoring of the functional component 5 in a mounting recess 3 is provided if the clamping component 15 has at least one protruding anchoring extension 53 in the transverse direction 16, which, in the clamped position of the functional component, engages behind one of the holding extensions 9 of the associated mounting recess 3 in the direction of the lower surface of the recess bottom. Advantageously, the protrusion is located in the area of the downwardly extending free end of clamping component 15, advantageously in the form of a unitary piece. Since the protrusion engages behind the holding extension 9, the functional component 5 is secured against a lifting even with high pulling forces. In the exemplified embodiment, the anchoring protrusion 53 is formed in such a manner that it causes a pulling force during the coaction with the holding extension 9 in the direction of the recess bottom which is transmitted through the slide 23 to base body 12, so that the functional component 5 is additionally forced against the mounting surface 2. This is achieved by the anchoring surface 55 of the anchor protrusion 53 facing upwardly toward the base body 12 which is slightly inclined with respect to the transverse direction 16 and slightly downwardly in a direction towards the recess bottom and in a direction towards the laterally provided free end of the anchoring protrusion 53. The oblique anchoring face 55 then operates in the clamped position against the transition rim 54 between the neck segment 6 and the mounting segment 7. Preferably, the engagement position of the anchoring protrusion 53 in the released position of the clamping component 15 is completely neutralized, so that the functional component 5 can be lifted off the mounting surface 2 at a right angle thereto.

It is also advantageous to provide an oblique face on the underside of the anchoring protrusion 53 facing the recess bottom which acts as an introduction surface 56. It extends from the free end of the clamping component 15 facing the recess bottom in the direction to the lateral free end of the anchoring protrusion 53 obliquely outside and upwardly. When attaching the functional component 5 on the support base 1, the introduction surface 56 contacts the transition edge rim 57 between the mounting surface 2 and neck section 6, whereby the slide 23 moves, against the resiliency of the spring arrangement 28, in the direction of the released position, until the anchoring protrusion 53 snaps through the neck segment 6 and into mounting segment 7. In this case, the actuating element 22 for mounting does not have to be used, although one naturally could use it.

It is also possible to equip a functional component 5 with a plurality of clamping devices 11 of the hitherto described type, which operate independent from each other. This is advantageous if, because of the largeness of the functional component 5, a simultaneous anchoring is sensible in a plurality of mounting recesses 3. A corresponding embodiment is indicated in FIG. 3, whereby the functional component 5, in addition to the structure shown in full lines, also includes the structure 58 shown in dash-dotted lines. Whereby, it is advantageous to arrange the clamping components 15 in such a manner that they operate both against the opposite recess flanks or the ones facing each other of the mounting recesses 3. Since both actuating elements 22 can be manually simultaneously operated, one can easily handle the large functional component 5.

In particular, with especially long functional components 5, it may be advantageous to provide a plurality of clamping components 15 along a longitudinal direction 35 at a distance from each other, which may be mounted on a common or independent slides 23. Depending on the design, a common or independent actuation is made possible.

What is claimed is:

1. A functional component (5) for demonstration and/or training purposes which is releasably secured to a mounting surface (2) of a support base (1) which is provided with at least a groove-like mounting recess (3), the functional component being provided with a clamping device (11) which is brought into engagement with said support base (1), said clamping device including at least one clamping component (15) which in a mounted position engages said support base (1) in said mounting recess (3), which is displaceable between a clamped position and a released position, characterized in that a slide includes said clamping component (15) extending therefrom, said slide (23) being slidably mounted on a base body of said clamping device (11) (12) and being coupled with an actuating element (22), a spring arrangement (28) being supported between said slide (23) and said base body (12) which prestresses said slide (23) toward said clamped position of said clamping component (15), said actuating element being formed as a pivot part being pivotable with respect to said base body (12) and engaging said slide (23) whereby the pivot part acts as a lever to move the clamping component toward the released position.

2. Functional component in accordance with claim 1 characterized in that said spring arrangement (28) is received in a recess (24) of said base body (12) between said slide (23) and a bottom (25) of said base body (12).

3. Functional component in accordance with claim 1 characterized in that said actuating element (22) is a two-armed lever having a shorter and longer arm, said shorter lever arm (38) being coupled with said slide (23) and said longer lever arm (39) being accessible for manual operation.

4. Functional component in accordance with claim 3, characterized in that said longer lever arm (39) is in an inclined position with respect to the mounting surface (2) and extends obliquely upwardly in the clamped position.

5. Functional component in accordance with claim 1 characterized in that said spring arrangement (28) is designed in such a manner that the engagement between said clamping component (15) and said support base (1) in said clamped position enables a displacement of said functional component (5) along a length of said mounting recess (3) by exerting a certain force.

6. Functional component (5) in accordance with claim 1 wherein said mounting recess includes opposed flanks (46, 47) and said clamping device (11) is provided with at least one support part (45) protruding from an underside of said base body (12), which in the mounted position, is inserted into the same mounting recess as said clamping component (15) by means of a laterally directed first support surface (48), whereby said base body (12) has a lower surface mounted on said first support base (1), and said clamping component (15) support surface in the clamped position contacts one of the opposed recess flanks (46) and said first support surface (48) contacts the other of the opposed recess flanks (47).

7. Functional component in accordance with claim 6, characterized in that said at least one support part (45) includes a second support surface (49) facing the recess flank (46) which is contacted by said clamping component (15) in the clamped position.

8. Functional component in accordance with claim 7, characterized in that said first and second support surface (48,49) are provided on opposite faces of said at least one support part (45).

9. Functional component in accordance with claim 6, characterized in that said clamping device comprises a second support part said clamping component (15) being mounted between said two support parts (45).

10. Functional component in accordance with claim 1, characterized in that said clamping component (15) is moveable for mounting between said clamped position and said released position substantially parallel with respect to said mounting surface (2) transveresly (16) to a length of said mounting recess (3).

11. Function component in accordance with claim 1, characterized in that said clamping component (15) is provided with an anchoring protrusion (53) which engages behind a holding extension (9) of said mounting recess (3) in said clamped position when the functional component (5) is in the mounted position, said holding extension (9) being formed, in particular, by a trasition area between a smaller neck portion (6) and a wider mounting segement (7) of said mounting recess (3).

12. Functional component in accordance with claim 11, characterized in that said anchoring protrusion (53) is a rib-like member.

13. Functional component in accordance with claim 1, characterized in that said base body (12) supports an advantageously exchangeable functional unit (13), in particular, of the pneumatic and/or hydraulic and/or electric and/or electronic and/or optical type.

14. Functional component in accordance with claim 1, characterized in that said at least one clamping component comprises a plurality of oppositely mounted, laterally offset clamping components which engage in different mounting recesses (3) of said support base (1) and which are each provided with an individual one of said actuating elements (22).

15. A functional component for demonstration purposes releasably securable on a mounting surface of a support base comprising:

a body;

a clamping device slidably mounted on said body for engaging the support base, said clamping device being slidable between a clamped and unclamped position;

a biasing means supported between said clamping device and said body, said biasing means urging said clamping device toward said clamped position; and an actuating element pivotally mounted on said body and operatively connected to said clamping device for slidably translating said clamping device between said clamped and unclamped positions.

16. The functional component as defined in claim 15, wherein said clamping device translates is adapted to translate in a horizontal plane substantially parallel to the mounting surface.

17. The functional component as defined in claim 15, wherein said clamping device includes an upper slide portion and a clamping component extending outwardly therefrom, said slide portion being slidably supported on said base and said clamping component being engageable with the support base.

18. The functional component as defined in claim 17, wherein said clamping component is adapted to extend into an elongate mounting recess formed in the support base and to engage a portion of the mounting recess, and the functional component is displacable along a length of the mounting recess when said clamping device is in said clamped position.

19. The functional component as defined in claim 15, wherein said actuating element is pivotable about a pivot point, said actuating element includes a lower portion extending below said pivot point operatively connected to said clamping device, and said actuating element further including an upper portion extending above said pivot point providing an element for an operator to manipulate said actuating element and translate said clamping device between said clamped and said unclamped positions.

* * * * *

UNITED STATES PATENT AND TRADEMARK OFFICE
CERTIFICATE OF CORRECTION

PATENT NO. : 5,820,091
DATED       : October 13, 1998
INVENTOR(S) : Erwin Kutscher It is certified that error appears in the above-identified patent and that said Letters Patent is hereby corrected as shown below:

| | |
|---|---|
| Column 8, Line 63, | now reads "on said first support base", should read --on said support base--. |
| Column 9, Line 20, | now reads "Function", should read --Functional--. |
| Column 9, Line 26, | now reads "trasition", should read --transition--. |
| Column 9, Line 27, | now reads "segement", should read --segment--. |
| Column 10, Line 17, | now reads "device translates is adapted to translate ", should read --device is adapted to translate to--. |

Signed and Sealed this

Fourth Day of May, 1999

Attest:

Attesting Officer

Q. TODD DICKINSON

Acting Commissioner of Patents and Trademarks